United States Patent [19]

Jarvis

[11] Patent Number: 5,479,642
[45] Date of Patent: Dec. 26, 1995

[54] METHOD FOR MAINTAINING LOW-OVERHEAD AND NON-COHERENT CACHE REFRESH MECHANISM WITH VALID STATUS MONITORING ON TIME PERIOD BASIS

[75] Inventor: Neil A. J. Jarvis, Reading, United Kingdom

[73] Assignee: Digital Equipment Corporation, Maynard, Mass.

[21] Appl. No.: 128,919

[22] Filed: Sep. 30, 1993

[30] Foreign Application Priority Data

Oct. 1, 1992 [GB] United Kingdom ............... 9220687

[51] Int. Cl.⁶ ................................................. G06F 12/08
[52] U.S. Cl. .................. 395/471; 395/460; 364/243.41; 364/DIG. 1; 364/246.91
[58] Field of Search .............................. 364/200 MS File, 364/900 MS File; 395/425, 445–473

[56] References Cited

U.S. PATENT DOCUMENTS

| | | | |
|---|---|---|---|
| 4,357,686 | 11/1982 | Scheuneman | 365/222 |
| 4,530,055 | 7/1985 | Hamstra et al. | 395/425 |
| 4,811,203 | 3/1989 | Hamstra | 395/425 |
| 4,814,981 | 3/1989 | Rubinfeld | 395/425 |
| 4,847,804 | 7/1989 | Shaffer et al. | 395/425 |
| 4,939,641 | 7/1990 | Schwartz et al. | 395/425 |
| 5,019,971 | 5/1991 | Lefsky et al. | 395/250 |
| 5,027,270 | 6/1991 | Riordan et al. | 395/425 |
| 5,038,278 | 8/1991 | Steely, Jr. et al. | 395/425 |
| 5,043,885 | 8/1991 | Robinson | 395/425 |
| 5,130,922 | 7/1992 | Liu | 395/200 |
| 5,136,706 | 8/1992 | Courts | 395/600 |
| 5,148,535 | 9/1992 | Ballard | 395/425 |
| 5,241,664 | 8/1993 | Ohba et al. | 395/425 |

FOREIGN PATENT DOCUMENTS 2127189  4/1984  United Kingdom ............ G06F 13/00

*Primary Examiner*—Matthew M. Kim
*Attorney, Agent, or Firm*—James F. Thompson

[57] ABSTRACT

A cache memory refreshment mechanism employing ageing-out criteria to remove stale entries from the cache memory. Entries in the cache memory may have one of four states: 1) VALID, indicating that the entry may be used by the local processor; 2) DYING, indicating that the entry may be used, but that it has been in existence in the cache for a predetermined period of time; 3) REFRESH, following a dying status, indicating a) that the entry may still be used, b) that the entry has just been used while in the dying state, and c) that retrieval of data to update the entry and return it its valid state is being effected; and 4) IDLE, indicating that the entry has been aged out of the cache, and may not be used. The refresh status enables a cache entry may be updated independently of the processor using the cache, and thus the number of processor stalls resulting from data not being available in the cache after having been aged out is substantially reduced.

1 Claim, 5 Drawing Sheets

METHOD FOR MAINTAINING LOW-OVERHEAD AND NON-COHERENT CACHE REFRESH MECHANISM WITH VALID STATUS MONITORING ON TIME PERIOD BASIS

FIELD OF THE INVENTION

The present invention relates to cache memory refreshment mechanisms, and in particular relates to a mechanism for determining which cache entries to maintain in an alive and valid state.

BACKGROUND OF THE INVENTION

In computer systems generally, where a number of independent processors share common-memory resource, it has become widespread practice for each of the independent processors to be provided with a cache memory containing copies of a sub-set of the data contained within the shared memory resource. The sub-set of data retained in the cache is desirably the most commonly-used information by the respective processor, and is used to reduce the number of requests which must be made to the shared memory resource for data to be transferred therefrom.

A number of different mechanisms exist in the prior art for maintaining data within caches and ensuring that relevant data therein is either updated when the shared memory resource is updated, or that the data in the cache is marked as being invalid.

In the latter case, there are a number of different techniques employed. Of particular relevance to the present invention is the cache refreshment mechanism which relies on an ageing criterion to determine at what point data in the cache can no longer be regarded as valid. Typically, when data has been requested by a processor from the shared memory resource, that data is stored in the cache, and its status is marked as valid. After a predetermined period of time, the data is then regarded as no longer valid (known as ageing-out), and its status marked accordingly.

When implementing such ageing mechanisms, it is customary to utilize a state machine to switch cache entries between an idle, invalid state to an alive, valid state when the entry has been retrieved from the shared memory resource, and to switch the entry back to an idle, invalid state once a predetermined period of time has elapsed. The time period may be determined from timers or counters.

It will be appreciated that during the intervening predetermined time period, the data may be requested by the processor any number of times (or even not at all), and may be provided thereto from the cache without reference to the shared memory resource, thus reducing the load thereon.

It will also be appreciated that once data has been "aged-out" of the cache to an idle state, then it is not available for use by the processor, and the shared memory resource must be requested to resupply the data. This inevitably results in a delay to the processor seeking the data, and it is common for a processor to enter a stall condition until the required data has been obtained.

SUMMARY OF THE INVENTION

It is therefore an object of the present invention to provide a mechanism for preventing unnecessary ageing-out of data when its imminent re-use is likely.

It is a further object of the present invention to allow ageing-out of data when its imminent re-use is unlikely.

It is a further object of the present invention to provide a mechanism for allowing a cache entry to be accessed during a period of time during which the cache entry is being updated.

In accordance with the present invention there is provided a method of refreshing a cache memory including the steps of:

a) storing a selected data signal group in said cache memory, and identifying said data signal group as having a first valid status;

b) after a first predetermined period of time, identifying said data signal group as having a second valid status;

c) monitoring the cache memory usage during a second predetermined period of time to determine whether said data signal group is accessed by said processing device; and, i) if it is so accessed, identifying said data signal group as having a third valid status, or ii) if it is not so accessed, identifying said data signal group as having a non-valid status.

BRIEF DESCRIPTION OF THE DRAWINGS

Embodiments of the present invention will now be described by way of example and with reference to the accompanying drawings in which.

DESCRIPTION OF THE PREFERRED EMBODIMENT

The cache refreshment mechanism of the present invention will now be described by reference to a typical usage of such a cache refreshment mechanism in a data communication network routing system.

Figure 1:
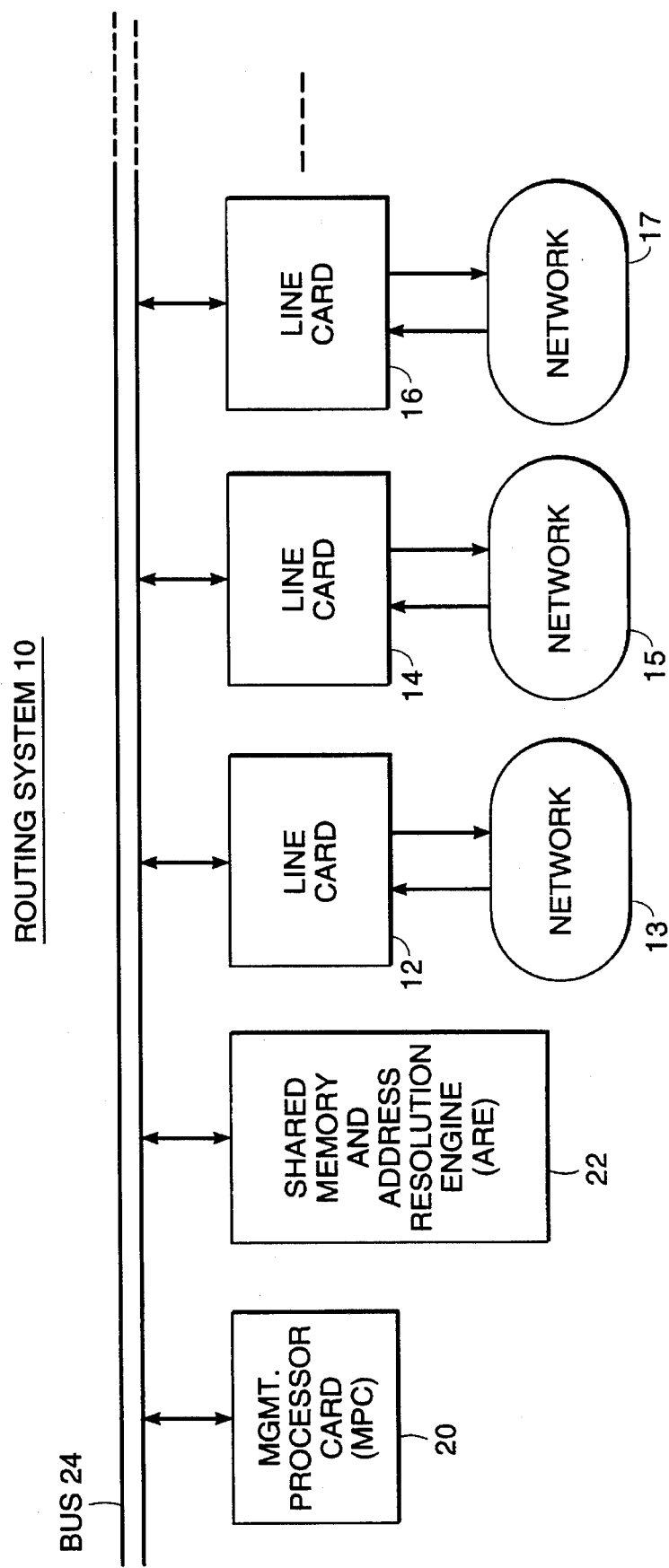
FIG. 1 shows a schematic diagram of a packet routing system illustrative of a possible use of the cache refreshment mechanism according to the present invention, and useful in the description thereof.

With reference to FIG. 1 there is shown a routing system 10 for the routing or bridging of data packets on a data communication network.

The routing system 10 includes a number of linecards (LC1,LC2,LC3) 12,14,16, each of which is connected to a corresponding network 13,15,17 of various types. The linecards 12,14,16 are each responsible for interfacing with the particular type of network to which they are attached. For example, linecard 12 may interface with an Fiber Distributed Data Interface (FDDI) optical fibre network 13, and linecard 14 might interface with an Ethernet type network 15. The linecards 12,14,16 are also coupled to a management processor card (MPC) 20 and a shared memory resource, 22 via a high-speed bus 24. The management processor card 20 is responsible for the overall management of the routing system 10. The shared memory resource 22 includes a pool memory used by all linecards in the system and, more specifically includes an address resolution engine (ARE). The address resolution engine 22 includes a database of addresses of nodes within the system 10, including information identifying the particular linecard which provides access to that address. In a typical system, greater than 10000 address might be expected.

Figure 2:
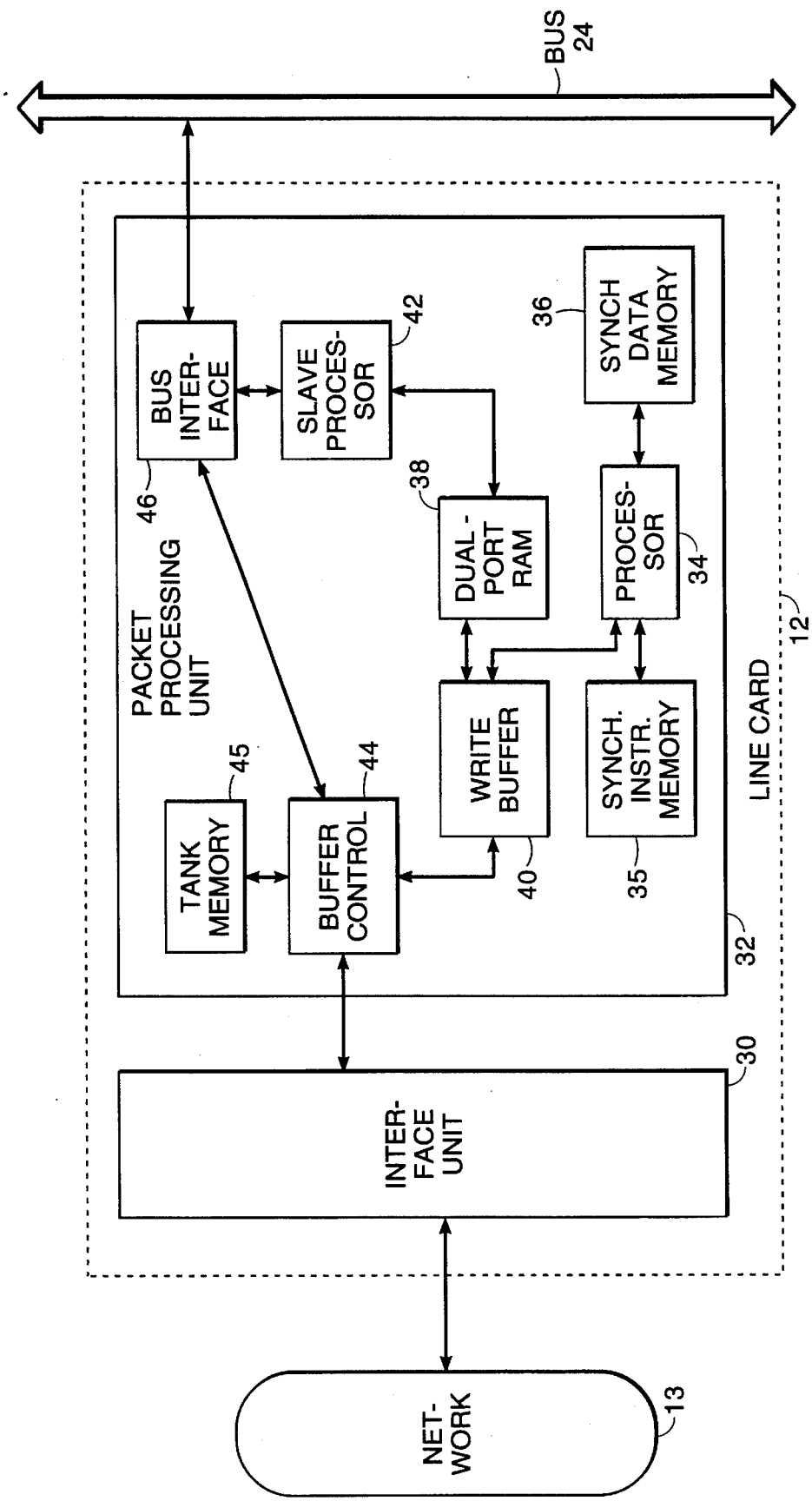
FIG. 2 shows a detailed schematic diagram of a part of the system of FIG. 1.

With reference to FIG. 2, there is shown a more detailed schematic diagram of the linecard 12. The live card 12 includes an interface unit 30 for receiving data packets from, and placing data packets onto the optical fibre network 13.

The linecard further includes a packet processing unit 32. Data packets received by interface unit 30 from the network 13 are passed to a buffer controller 44 with an associated tank memory 45 which controls the inflow and outflow of the data packets from and to the interface. Packet processing capability is provided by a high-speed processor 34 with local synchronous instruction memory (SIM) 35 and synchronous data memory (SDM) 36. Processor 34 receives data for processing via a write buffer 40. Processed data packets which are to be routed to other linecards 14,16 in the routing system 10 are placed onto the high-speed bus 24 by a bus interface unit (BIU) 46. The packet processor also includes a slave processor 42 which receives lower priority processing tasks from high-speed processor 34 via a dual port random-access memory (RAM) 38.

In order to route or bridge data packets, the packet processing unit 32 must interrogate the address resolution engine 22 with information extracted from the received packet. To do this, a request must be formulated and transmitted to the address resolution engine 22 over bus 24. In response to this interrogation, the address resolution engine 22 responds with the necessary data determining where the packet will be forwarded to, plus additional information relating to destination media access control addresses in the case of a routing packet, and filtering information in the case of a bridge packet.

Since: (a) network traffic tends to be somewhat repetitive in nature, that is, it is common to find trains of packets for the same destination, and (b) the address resolution engine 22 is a shared system resource requiring usage of the system bus 24 with which to provide access by individual linecards 12,14,16, it is desirable to provide each packet processing unit 32 with a cache memory for storing the results of recent address resolution engine interrogations. In the system configuration described, the processor 34 typically stores such a cache in memory 36, working in the high-speed domain of the processor 34. Thus the processor need not await formulation of requests to the address resolution engine 22 by slave processor 42, and transmission and return of data over the bus 24 if the addressing data is in the cache memory 36. In the present example, the cache 36 may typically include data in respect of 2000 addresses, or 20% of the addresses available in the address resolution engine 22.

As has been discussed, a cache system normally includes a cache refreshment mechanism for ensuring that cached data which becomes invalid (or "stale") is removed from the cache. In the present example, the network topology and parameters related thereto will change over time (such as with the addition and removal of nodes to the various systems). It is undesirable in the present case to further load the system 10 by requiring the management processor 20 to update all of the packet processor caches 36 in each linecard every time the address resolution engine 22 is updated with new routing and bridging data.

If the data in the cache 36 is not maintained in an up-to-date condition, data packets will be routed to incorrect addresses, and either will reach the required destination very much more slowly than would otherwise be the case, or result in a large number of failed transactions and subsequent retransmissions. Therefore, in order to prevent stale addressing data being used, the cache refreshment mechanism employs an ageing strategy to identify cache entries which should no longer be used after they have existed for a predetermined period of time. Such entries are normally marked as "stale" and may be deleted or overwritten.

In the present invention, cache entries which have been frequently accessed within the predetermined period, ie. as a result of a large train of packets to the same destination, are not marked for deletion since it is likely that continued use will be made of those entries. Cache entries which have not been used within that predetermined period of time are considered unlikely to be required, and therefore may be aged out to free up cache memory space for data of more immediate use.

Figure 3:
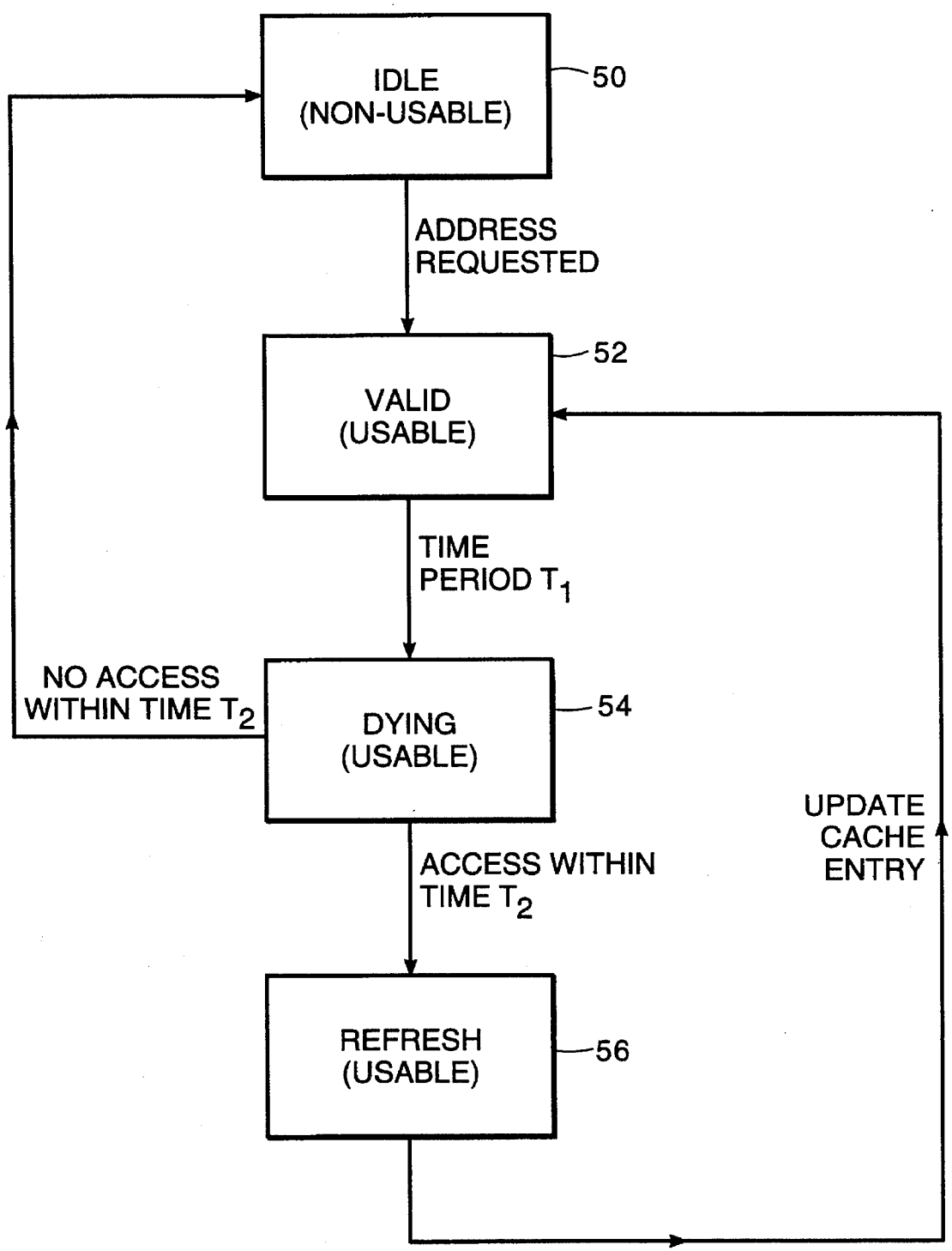
FIG. 3 shows a flow diagram representing a cache memory refreshment mechanism in accordance with the present invention.

A cache refreshment mechanism effecting this inventive strategy is represented by way of example in FIG. 3. This is achieved by the introduction of a four state ageing mechanism. For convenience, these four states will be identified as IDLE, VALID, DYING and REFRESH (50,52,54,56 respectively).

The operation of the cache refreshment mechanism will be described, by way of example, with reference to the system of FIG. 1.

As a packet is received for processing by processor 34, it needs to determine what address data is required from the address resolution engine 22. Processor 34 checks cache 36 to establish whether such data is already present. If the data is not available, the processor 34 requests the data from the address resolution engine 22 using slave processor 42 to place such a request onto the system bus. Upon receipt of the address data from address resolution engine 22, the data is stored in the cache 36 and identified as having VALID status 52 in order to be available for later use. During a first time period, $T_1$, if the processor 34 subsequently requires this data, it will be able to retrieve it from the cache 36, recognizing that the entry is still usable by its VALID status. After the first predetermined period of time $T_1$, the cache refreshment mechanism changes the status of the VALID entry to a new status DYING 54. In this status, the packet processor 34 may still validly retrieve this data from the cache, as the DYING status is recognized as representing a usable data entry.

Following transfer of the status of the data entry to DYING, if the processor 34 does not request data corresponding to a DYING entry within a second predetermined time $T_2$, the cache refreshment mechanism changes the status of the DYING entry to IDLE 50 which indicates to the processor 34 that the entry is now non-usable, ie. it may not be used for packet routing. Thus, a further interrogation of the address resolution engine 22 is necessary if the data is again required by the processor, causing it to stall while the data is sought.

If, however, the processor 34 does request the data corresponding to a DYING entry before the second predetermined time period, $T_2$, expires, then the cache refreshment mechanism changes the status of the DYING entry to REFRESH 56. The REFRESH status indicates to the processor that the entry is old, but still usable and that the data is likely to continue to be required. In addition, the REFRESH status prompts the cache refreshment mechanism to request updated data from the address resolution engine 22 to overwrite the entry, This can be achieved independent of the operations of the processor 34, which can instruct the slave processor 42 to obtain such data as a low priority task. The packet processing capability of the system is therefore not significantly compromised by the request for cache refresh data. Once the updated data has been received from the address resolution engine 22, the cache refreshment mechanism overwrites the original entry, and changes its status back to VALID 52. The process will then be recommenced. Thus an entry in frequent use will never age out and cause the processor 34 to stall while awaiting data from the address resolution engine. Additionally, a cache entry which is being updated with new information is still accessible while the updating information is being sought.

In a practical implementation of the cache refreshment mechanism described with reference to FIG. 3, a state machine may be used to update cache entries in accordance with the cache memory shown in FIG. 4, and the state diagram shown in FIG. 5.

Figure 4:
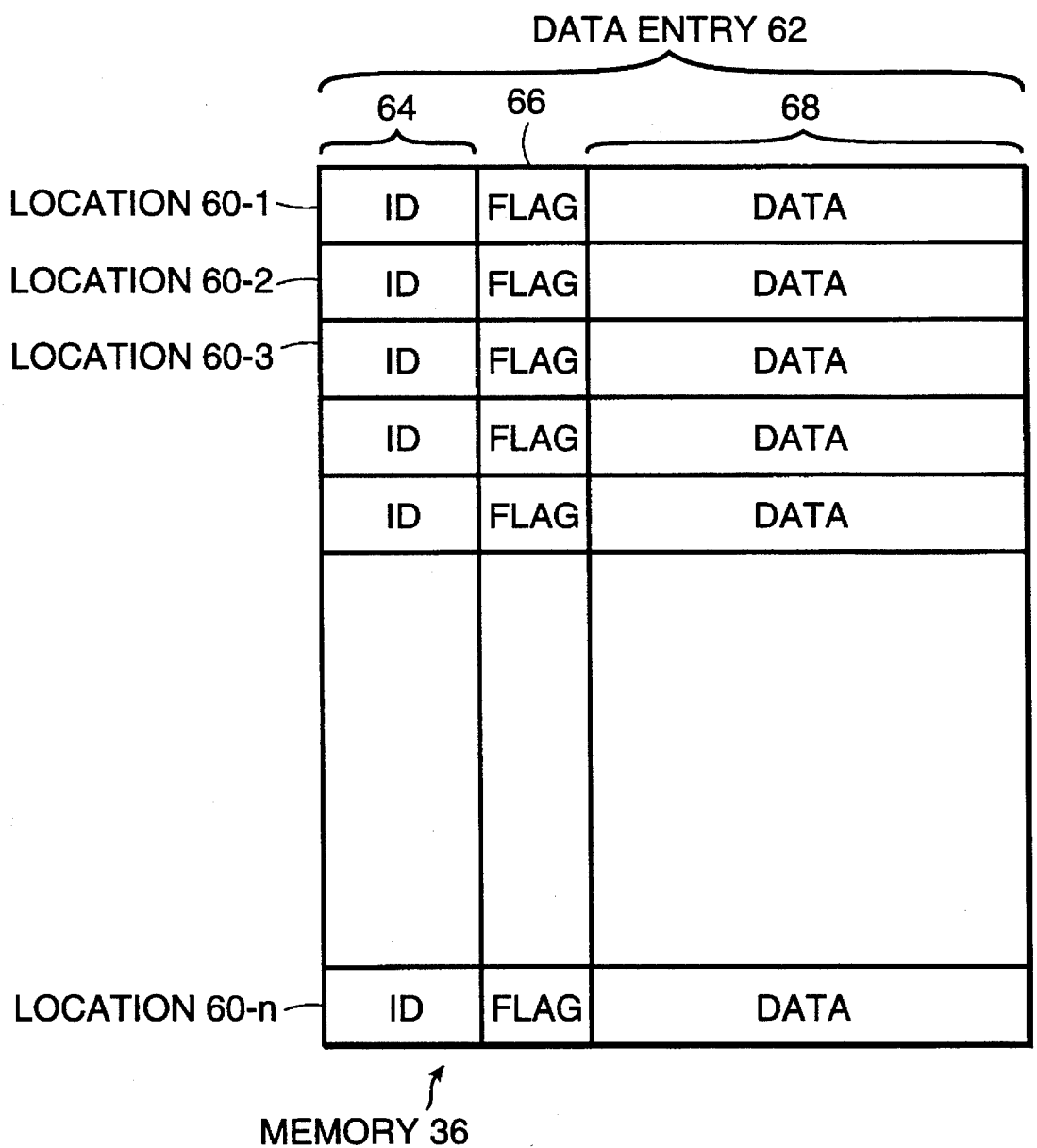
FIG. 4 shows a cache memory in accordance with the present invention.
Figure 5:
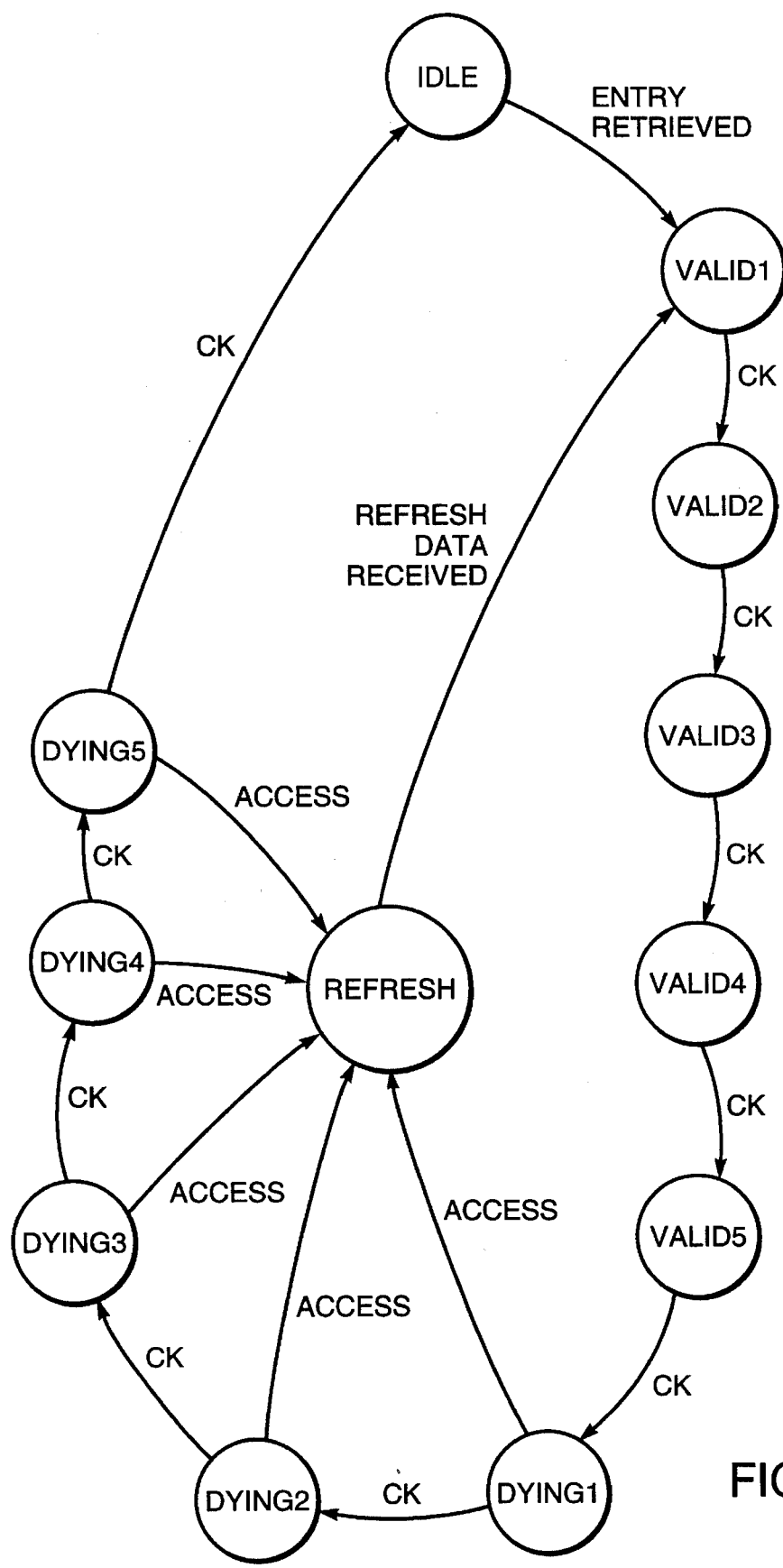
FIG. 5 shows a state diagram representing an implementation of the flow diagram of FIG. 3.

With reference now to FIG. 4, the cache memory 36 includes a plurality of locations 60-1, 60-2 ... 60-n, each of which is capable of storing a data entry 62. Each data entry 62 includes a unique identifier portion 64, a data portion 68, and a flag portion 66. The flag portion stores a plurality of bits which represent a status corresponding to one of those identified in the diagram of FIG. 5, now to be explained.

When a data entry is first placed in the cache 36, the flag is set to VALID1. The state machine systematically examines the flag portion of each entry in the cache in turn at regular intervals indicated by "clock" CK. With each successive clock, the flag portion is transitioned to the next state, VALID2, VALID3 etc. After VALID5, the flag is transitioned to DYING1 state. From each DYING 1 ... DYING5 state, the flag transition is still made each successive clock CK to the successive DYING state (or ultimately, from DYING5 state to IDLE). However, an entry access by the processor (indicated by ACCESS) will transition the current DYING state into the REFRESH state.

The REFRESH state may be regarded as immune to the clock CK, and is only transitioned to the VALID1 state upon receipt of the corresponding refresh data: this may be effected by the processor when updating the entry. The state machine may thus pass over all such entries in the REFRESH state.

Clearly the number of VALID states and DYING states shown in the diagram is entirely exemplary, and in practice would be chosen in accordance with the particular timing requirements of the cache refreshment mechanism. Additional states may be incorporated for other purposes, providing each is identified as corresponding either to usable or non-usable status.

It will be apparent that the cache refreshment mechanism described herein is relevant to a wide range of applications where non-coherent caches are maintained using an ageing-out procedure, and is not limited to the specific example relating to a packet processing environment.

I claim:

1. A method of operating a cache, comprising the steps of:
(A) for each of data requests generated by a processor coupled to the cache, performing the following steps:
(i) determining whether a copy of the requested data is stored in the cache;
(ii) if a copy of the requested data is determined to be stored in the cache, performing the following steps:
(a) retrieving a status flag associated with the stored copy of the requested data from the cache, the retrieved status flag indicating whether the stored copy of the requested data has an IDLE, VALID, DYING, or REFRESH status, the IDLE status indicating that the stored copy is non-usable for satisfying processor data requests, the VALID status indicating that the stored copy is usable for satisfying processor data requests for at least a first time period $T_1$ commencing when the stored copy first attains VALID status, the DYING status indicating that the stored copy is usable for satisfying processor data requests but will become non-usable after the passage of a second time period $T_2$ in the absence of access thereto by the processor, the second time period $T_2$ commencing when the stored copy first attains DYING status, and the REFRESH status indicating that the stored copy is usable for satisfying processor data requests but will shortly be replaced by a fresh copy of the requested data to be retrieved from a memory coupled to the cache;
(b) if the stored copy is indicated by the retrieved status flag as having an IDLE status, performing the steps recited in (A)(iii) below for the case in which a copy of the requested data is determined not to be stored in the cache;
(c) if the stored copy is indicated by the retrieved status flag as having either a VALID, DYING, or REFRESH status, retrieving the stored copy of the requested data and returning the retrieved copy to the processor in satisfaction of the processor's data request; and
(d) if the stored copy is indicated by the retrieved status flag as having a DYING status, performing the following steps:
(1) changing the stored status flag to indicate that the stored copy now has a REFRESH status; and
(2) initiating an update of the stored copy from the memory; and
(iii) if a copy of the requested data is determined not to be stored in the cache, performing the following steps:
(a) retrieving a copy of the requested data from the memory;
(b) storing the retrieved copy in the cache;
(c) setting the status flag associated with the stored retrieved copy to VALID upon storing the retrieved copy in the cache; and
(d) returning the retrieved data to the processor in satisfaction of the processor's data request;
(B) for each of stored copies of requested data in the cache, periodically performing the following steps:
(i) retrieving the status flag associated with the stored copy;
(ii) if the retrieved status flag indicates that the stored copy has a VALID status, performing the following steps:
(a) monitoring the passage of $T_1$ for the stored copy; and
(b) setting the status flag for the stored copy to DYING if $T_1$ has passed; and
(iii) if the retrieved status flag indicates that the stored copy has a DYING status, performing the following steps:
(a) monitoring the passage of $T_2$; and
(b) setting the status flag for the stored copy to IDLE if $T_2$ has passed; and
(C) for each of the stored copies for which an update from the memory has been initiated, performing the following steps:
(i) retrieving a fresh copy of the requested data from the memory;
(ii) storing the retrieved fresh copy in the cache replacing the stored copy; and
(iii) setting the status flag for the stored fresh copy to VALID upon storing the retrieved fresh copy in the cache.

* * * * *